(12) United States Patent
Sasaki et al.

(10) Patent No.: US 7,321,672 B2
(45) Date of Patent: Jan. 22, 2008

(54) IMAGE READING APPARATUS AND IMAGE READING SYSTEM EQUIPPED WITH THE IMAGE READING APPARATUS

(75) Inventors: Kazuhiro Sasaki, Sagamihara (JP); Minoru Kanbara, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 232 days.

(21) Appl. No.: 11/090,368

(22) Filed: Mar. 25, 2005

(65) Prior Publication Data

US 2005/0213173 A1 Sep. 29, 2005

(30) Foreign Application Priority Data

Mar. 26, 2004 (JP) ............................ 2004-091190
Mar. 26, 2004 (JP) ............................ 2004-091191

(51) Int. Cl.
  G06K 9/00 (2006.01)
  G06K 5/00 (2006.01)
  G06K 9/74 (2006.01)

(52) U.S. Cl. .................. 382/124; 250/556; 356/71
(58) Field of Classification Search ........ 382/124–126; 250/556; 356/71; 361/179
  See application file for complete search history.

(56) References Cited

U.S. PATENT DOCUMENTS

| | | | |
|---|---|---|---|
| 6,414,297 | B1 | 7/2002 | Sasaki et al. |
| 2002/0180585 | A1 | 12/2002 | Kim et al. |
| 2002/0196036 | A1* | 12/2002 | Toyoshima et al. ......... 324/702 |
| 2003/0174870 | A1 | 9/2003 | Kim et al. |
| 2004/0184027 | A1* | 9/2004 | Mizutani et al. ............... 356/71 |
| 2004/0240712 | A1* | 12/2004 | Rowe et al. ................. 382/124 |
| 2004/0252867 | A1* | 12/2004 | Lan et al. .................... 382/124 |
| 2006/0017862 | A1 | 1/2006 | Song et al. |

FOREIGN PATENT DOCUMENTS

| | | |
|---|---|---|
| CN | 1256773 A | 6/2000 |
| CN | 1451205 A | 10/2003 |
| CN | 1689025 A | 10/2005 |
| JP | 08-008414 A | 1/1996 |
| JP | 11-259638 A | 9/1999 |
| JP | 2002-279412 A | 9/2002 |
| JP | 2003-008826 A | 1/2003 |
| KR | 10-2004-0012294 A | 2/2004 |
| WO | WO 2004/019382 A2 | 3/2004 |

* cited by examiner

*Primary Examiner*—Georgia Epps
*Assistant Examiner*—Brian J Livedalen
(74) *Attorney, Agent, or Firm*—Frishauf, Holtz, Goodman & Chick, P.C.

(57) ABSTRACT

An image reading system comprising a display panel with an image display area formed by a plurality of display pixels which emits display light and displays an image in a viewing field side corresponding to a display signal from the image display area; a transparent substrate which has a read area provided in a viewing field side of the display panel; a plurality of photosensors formed in the read area above the transparent substrate; a driver circuit section formed in an outer side of the read area as one unit with the photosensors; a transparent conductive film for electrostatic protection is provided in an upper part of a plurality of photosensors and the driver circuit section; and comprises a photosensor panel which reads an image of a detectable object placed on the read area that penetrated at least some of the display light emitted from the image display area.

19 Claims, 8 Drawing Sheets

IMAGE READING APPARATUS AND IMAGE READING SYSTEM EQUIPPED WITH THE IMAGE READING APPARATUS

CROSS-REFERENCE TO RELATED APPLICATIONS

This application is based upon and claims the benefit of priority from the prior Japanese Patent Applications No. 2004-091190, filed Mar. 26, 2004 and No. 2004-091191, filed Mar. 26, 2004, the entire contents of which is incorporated herein by reference.

BACKGROUND OF THE INVENTION

1. Field of the Invention

The present invention relates to an image reading apparatus and image reading system comprising the image reading apparatus. More particularly, the present invention relates to an image reading apparatus which can be suitably carried in a portable electronic device as well as favorably read a detectable object image.

2. Description of the Related Art

In recent years, the continuous global proliferation of Information Technology Equipment (ITE) and other compact electronic devices, such as cellular phones, Personal Digital Assistants (PDAs), etc. has been truly remarkable. Furthermore, there is a growing public demand for these electronic digital devices to be outfitted with credit card payment processing cryptographic functions for processing electronic money or e-money and digital cash payments. In order to maintain security on individual account and eliminate security vulnerabilities, an electronic device outfitted with a personal authentication function which identifies and authenticates an individual user is needed. This type of personal authentication requires a device comprising an image reading apparatus that reads a detectable object image, for example, a fingerprint, etc.

Several types of image reading apparatus for reading detectable object images, such as a fingerprint, etc. are known which for example use an electrostatic capacity reading type configuration or an optical type configuration of a Charged-Coupled Device (CCD), Complementary Metal Oxide Semiconductor (CMOS) sensors, etc. The electrostatic capacity type configuration read an image of a detectable object by detecting an electrostatic capacity difference based on a detectable object (finger) and an electrical potential difference generated between detection sensors. Also, some reading apparatus have an optical type configuration which read light and dark information of a detectable object via an optical system, for example, a prism, a mirror, etc.

As for an electrostatic capacity type configuration mentioned above, although the detection sensor area where a detectable object is placed for reading an object image can be formed in a thin and lightweight construction, this type of image reading apparatus is highly susceptible to static electricity damage of the detection sensor by a static electricity charge from a detectable object.

Conversely, although a thin and lightweight construction in an optical configuration is problematic when the optical system is intervened between a detectable object and the photosensors, this type of image reading apparatus is resistant to static electricity damage of the photosensors by a static electricity charge from a detectable object and has an advantage in that fingerprint reading response speed is also relatively faster.

However, since CCD or CMOS sensors are abundantly in use as photosensors which are situated above a semiconductor substrate and these sensors contain an opaque layer, an electronic device comprising such an image reading apparatus must be installed in a different location besides the image display section. For this reason, when considering the size of an image reading apparatus in such a configuration which requires an area of sufficient size for reading detectable object images, such as fingerprints, etc., there is a persistent problem that the overall size of the electronic device will increase. Therefore, in order to control enlargement in the size of the electronic device, the size of an image reading apparatus must be smaller. In that case, it becomes troublesome to satisfactorily read detectable object images, such as fingerprints, etc. Thus, there is a drawback in that a structurally stable personal authentication device has not yet been technologically advanced.

SUMMARY OF THE INVENTION

The present invention has been made in view of the circumstances mentioned above. Accordingly, the present invention provides an image reading apparatus and an image reading system comprising an image reading apparatus which has the advantages of (1) being able to favorably read a detectable object image, for example, a fingerprint, (2) the size of the image reading apparatus can be made smaller while still being able to read a detectable object and (3) the resulting overall enlargement size of the electronic device in which this image reading apparatus is installed can be controlled.

In order to acquire the above-mentioned advantages, the image reading apparatus in the present invention comprises a substrate which has a read area; a plurality of photosensors formed in the read area above the substrate; a driver circuit section formed in an outer side of the read area as one unit with the photosensors above the substrate which drives the photosensors; a transparent conductive film for electrostatic protection provided in an upper part of the plurality of photosensors and the driver circuit section above the substrate through a transparent insulating film.

The driver circuit section is provided adjacent to the read area above the substrate. Also, the substrate has transparency; an external connection terminal for the driver circuit section and an external connection terminal for the transparent conductive film are provided in an end part above the substrate; a lead around wire which connects the driver circuit section and an external connection terminal for the driver circuit section is provided below the transparent insulating film; and a lead around wire which connects the transparent conductive film and an external connection terminal for the transparent conductive film is provided above the transparent insulating film. Further, an electrostatic protection element is formed as one unit among the plurality of photosensors and the driver circuit section above the substrate.

In the image reading apparatus, the photosensors constitute photoelectric conversion type thin film transistors comprising a source electrode and a drain electrode composed of an electrode material having permeability are formed across a channel region composed of a semiconductor layer above the substrate; and a first gate electrode composed of an electrode material having permeability and a second gate electrode composed of an electrode material having impermeability are formed in an upper side and a lower side of the channel region through an insulating film.

An image reading system in the present invention for acquiring the above-mentioned advantages comprises an image display device comprising a display panel with an image display area formed by a plurality of display pixels which emits display light corresponding to a display signal from the image display area and displays an image in a viewing field side; and a photosensor panel which reads an image of a detectable object placed on the read area that penetrated at least some of the display light emitted from the image display area and comprising a transparent substrate which has a read area and provided on the viewing field side of the image display device; a plurality of photosensors formed in the read area above the transparent substrate; and a driver circuit section formed in an outer side of the read area as one unit with the photosensors above the transparent substrate which drives the photosensors.

The photosensor panel outer shape size is equivalent to the display panel outer shape size.

Furthermore, a transparent conductive film for electrostatic protection is provided in an upper part of the plurality of photosensors and the driver circuit section through a transparent insulating film.

The driver circuit section is provided adjacent to the read area above the transparent substrate. Also, an external connection terminal for the driver circuit section and an external connection terminal for the transparent conductive film are provided in an end part above the transparent substrate; a lead around wire which connects the driver circuit section and an external connection terminal for the driver circuit section is provided below the transparent insulating film; and a lead around wire which connects the transparent conductive film and an external connection terminal for the transparent conductive film is provided above the transparent insulating film. Furthermore, in the photosensor panel above the transparent substrate an electrostatic protection element is formed as one unit among the plurality of photosensors and the driver circuit section.

The read area is an area corresponding to the display area of the display panel in the image display device having at least the equivalent area as the display area. In this case, the display panel further comprises a means for performing display which prompts or guides placement of a detectable object to the read area of the photosensor panel.

Additionally, the read area of the photosensor panel constitutes a partial region of an area corresponding to the display area of the display panel in the image display device; and the photosensor panel further contains a dummy read area which has transmissivity equivalent to the read area. The dummy area has a structure and size equivalent to the photosensors and the dummy photosensors which are not driven by the driver circuit section are arranged in a matrix form. In this case, the image reading system further comprises a means for performing display which prompts or guides placement of the detectable object to the read area of the photosensor panel in an area corresponding to the dummy area read area of the photosensor panel of the display panel.

The photosensors, at least, a source electrode and a gate electrode composed of an electrode material having permeability are formed across a channel region composed of a semiconductor layer above the transparent substrate; and a first gate electrode composed of an electrode material having permeability and a second gate electrode composed of an electrode material having impermeability are formed in an upper side and a lower side of the channel region through an insulating film.

Additionally, the image reading system comprises a means for changing sequentially the display colors of the display panel to red, green and blue; and a means for reading the detectable object image in the each display color, creating a composite of a read image in each display color and acquiring a color image with the photosensor panel.

In the image reading system, the display panel is a transmissive type color liquid crystal display panel constituted by having two opposing transparent substrates. The display panel further comprises a backlight in an opposite side of the viewing field side. Otherwise, the display panel is a liquid crystal display panel with a field sequential drive method constituted by having two opposing transparent substrates; and the display panel further comprises a backlight provided in an opposite side of the viewing field side and controlled to change luminous colors sequentially to red, green and blue.

Moreover, the display panel is constituted by having two opposing transparent substrates and one of the transparent substrates in the viewing field side of the display panel functions as the transparent substrate in the photosensor panel.

Additionally, the display panel is a self-luminescence type display panel having light emitting devices in the display pixels and is an organic electroluminescence display panel which has organic electroluminescence display devices as the light emitting devices. For example, a top emission structure type. The organic electroluminescence display panel and the transparent substrate in the photosensor display panel are bonded together with sealant.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Hereinafter, the present invention with regard to an image reading apparatus and an image reading system comprised with an image reading apparatus will be described in detail based on the embodiments shown in the accompanying the drawings.

Initially, the image reading apparatus related to the present invention will be explained.

<Image Reading Apparatus>

(First Embodiment of the Image Reading Apparatus)

Figure 1:
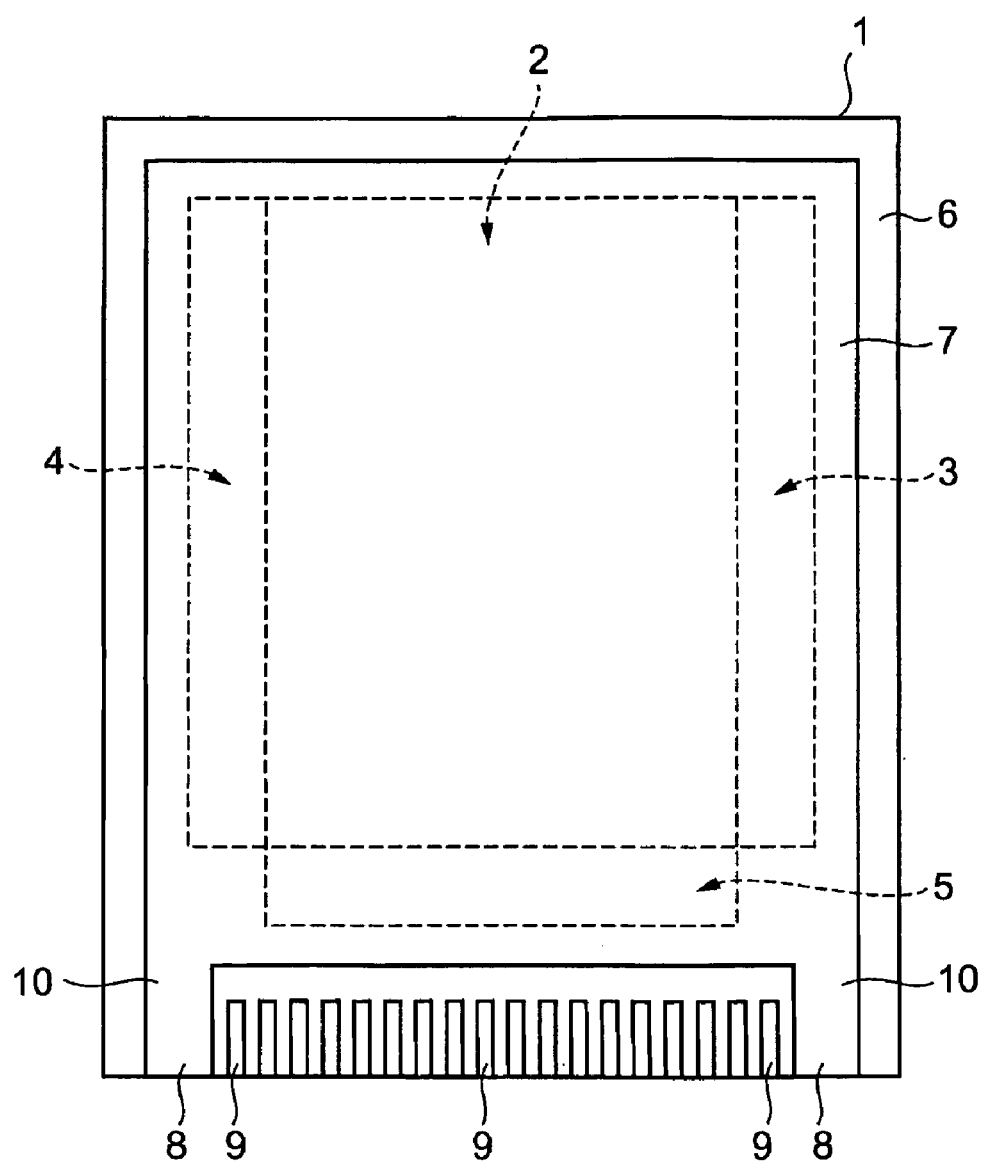
FIG. 1 is a top view diagram of the substantial part of the image reading apparatus in a first embodiment of the present invention.

FIG. 1 is a top view diagram of the substantial part of the image reading apparatus in a first embodiment of the present invention.

This reading apparatus is comprised with a glass substrate 1. A plurality of photosensors is arranged in a matrix form (two-dimensional) substantially in the central part of a read area 2 (described later) above the glass substrate 1. A $1^{st}$, $2^{nd}$ and $3^{rd}$ driver circuit sections 3, 4, 5 (described later) are provided for driving a plurality of photosensors provided in the read area 2.

Above the glass substrate 1 including a plurality of photosensors provided in the read area 2 and the $1^{st}$ to $3^{rd}$ driver circuit sections 3, 4, 5, a transparent insulating film 6 composed of an overcoat film (described later) is provided. A transparent conductive film 7 for electrostatic protection is provided on the upper surface of the transparent insulating film 6 in the portion corresponding to an area some extent larger than the arrangement areas for the read area 2 and the $1^{st}$ to $3^{rd}$ driver circuit sections 3, 4, 5.

External connection terminals 8 for the transparent conductive film are provided on either side of the lower end part of the upper surface transparent insulating film 6. A plurality of external connection terminals 9 for the driver circuit sections are provided on the upper surface of the transparent insulating film 6 between these two external connection terminals 8 for the transparent conductive film.

The external connection terminals 8 for the transparent conductive film are connected to the end part on either side of the transparent conductive film 7 via a lead around wire 10 for the transparent conductive film provided on the upper surface of the transparent insulating film 6. In this case, the line width of the lead around wire 10 for the transparent conductive film, for example, constitutes the same width as the external connection terminals 8 for the transparent conductive film.

The external connection terminals 9 for the driver circuit sections are connected to the $1^{st}$ to $3^{rd}$ driver circuit sections 3, 4, 5 via the lead around wire 10 for the driver circuit sections provided below the transparent insulating film 6 (described later).

Figure 2:
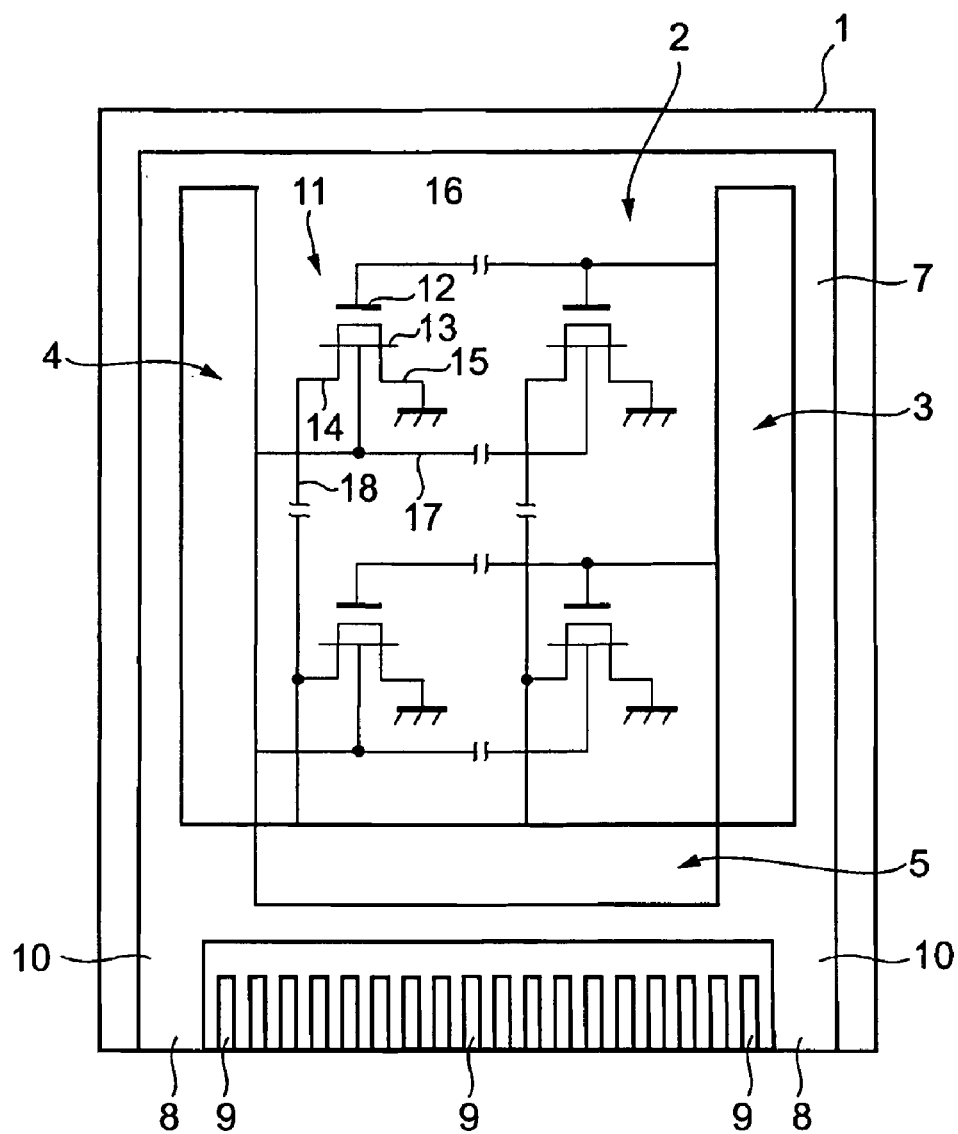
FIG. 2 is a top view diagram of the equivalent circuit of the substantial part of the image reading apparatus in a first embodiment of the present invention.

Next, FIG. 2 is a top view diagram of the equivalent circuit of the image reading apparatus in the first embodiment of the present invention.

In the read area 2 above the glass substrate 1, photosensors of a plurality of photoelectric conversion type thin film transistors 11 are arranged in a matrix form. Although the detailed structure will be explained later, the thin film transistors 11 comprise a top gate electrode 12, a bottom gate electrode 13, a drain electrode 14 and a source electrode 15.

The top gate electrode 12 is connected to the $1^{st}$ driver circuit section 3 (top gate driver) via a top gate line 16 arranged in a column direction of the read area 2. The bottom gate electrode 13 is connected to the $2^{nd}$ driver circuit section 4 (bottom gate driver) via a bottom gate line 17 in a column direction.

The drain electrode 14 is connected to the $3^{rd}$ driver circuit section 5 (drain driver) via a drain line 18 arranged in a row direction of the read area 2. The source electrode 15 is connected to the external connection terminal for ground among the external connection terminals 9 for the driver circuit sections via a ground line (not shown) arranged in the read area 2, etc.

Next, a detailed structure example of one portion of the reading apparatus shown in FIG. 2 will be explained.

Figure 3:
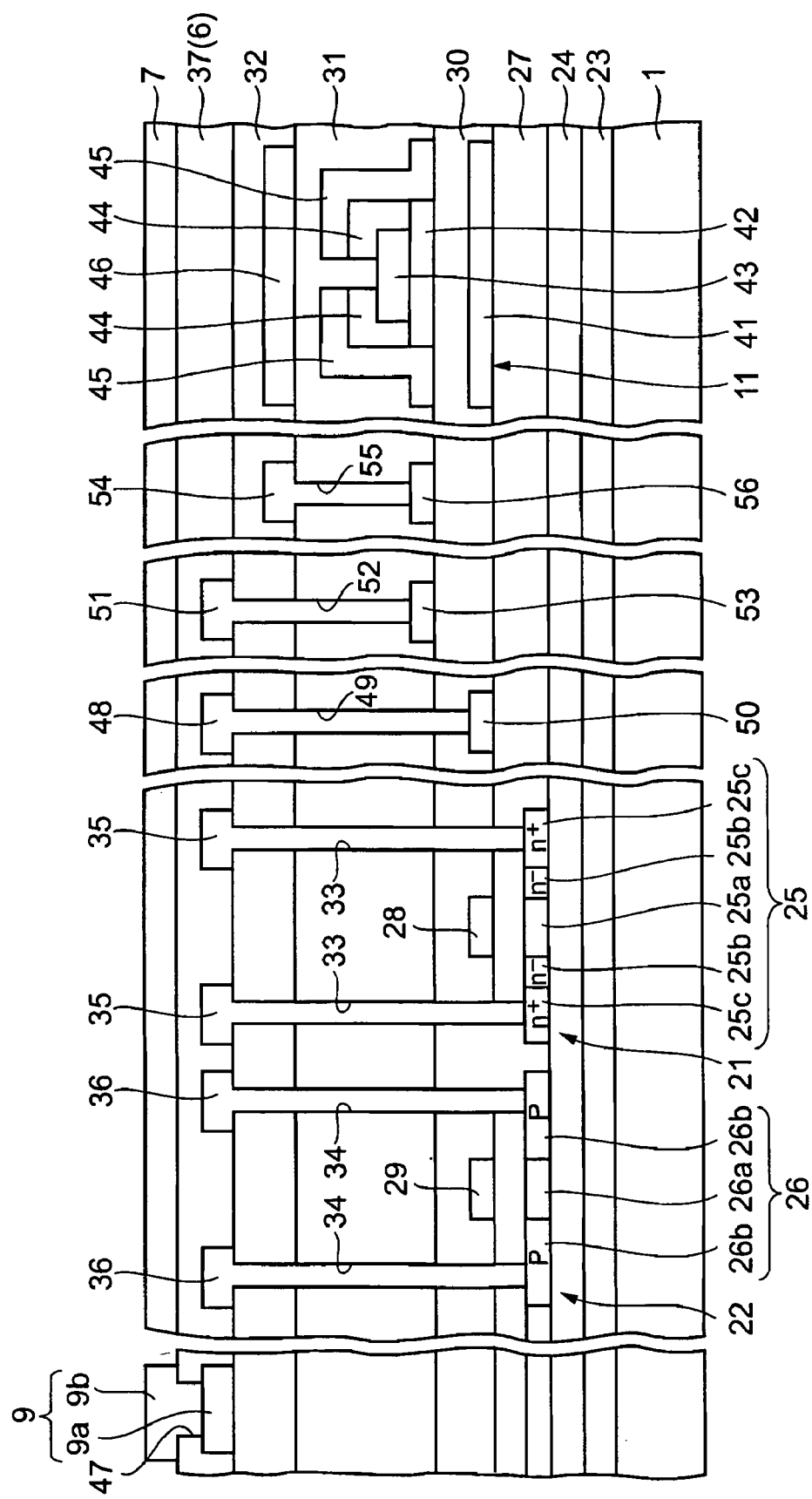
FIG. 3 is a cross sectional view showing an example of the detailed structure of the image reading apparatus in a first embodiment of the present invention.

FIG. 3 is a cross sectional view showing an example of the detailed structure of the image reading apparatus in the first embodiment of the present invention.

In this case, from the left side of FIG. 3 toward the right side shows a cross sectional view of the external connection terminals 9 portion for the driver circuit sections; a cross sectional view of a CMOS thin film transistor portion which constitutes each part of the $1^{st}$ to $3^{rd}$ driver circuit sections 3, 4, 5; a cross sectional view of a $1^{st}$ to $3^{rd}$ interlayer contact portion and a cross sectional view a photoelectric conversion type thin film transistor 11 portion.

First, the CMOS thin film transistor portion which constitutes each part of the $1^{st}$ to $3^{rd}$ driver circuit sections 3, 4, 5 will be explained. The driver circuit section formation area above the substrate 1, for example, is provided with CMOS thin film transistor composed of an NMOS thin film transistor 21 and PMOS thin film transistor 22 by means of a polysilicon thin film transistor. Each of the thin film transistors 21 and 22 are comprised with a semiconductor thin film 25 and 26 composed of polysilicon provided on the upper surface of the $1^{st}$ and $2^{nd}$ base insulating films 23 and 24 provided on the upper surface of the glass substrate 1. In this case, the $1^{st}$ base insulating film 23 is composed of silicon nitride and the $2^{nd}$ base insulating film 24 is composed of silicon oxide.

The NMOS thin film transistor 21, for example, is constituted by having a Lightly Doped Drain (LDD) structure. Namely, the central part of the semiconductor thin film 25 of the NMOS thin film transistor 21 is formed with a channel region 25a composed of an intrinsic region. On either side are source-drain regions 25b composed of an N-type impurity low concentration region and further on either side (subsequent outer end sides) are source-drain regions 25c composed of an N-type impurity high concentration region. On the contrary, the central part of the semiconductor thin film 26 of the PMOS thin film transistor 22 is formed with a channel region 26a composed of an intrinsic region. On either side are source-drain regions 26b composed of a P-type impurity high concentration region.

A gate insulating film 27 is provided on the upper surface of the $2^{nd}$ base insulating film 24 containing the semiconductor thin film 25 and 26 which is composed of silicon nitride. A gate electrodes 28 and 29 are provided respectively above each channel region 25a and 26a on the upper surface of the gate insulating film 27 which are composed of impermeable metal, for example, aluminum-based metal, etc. A bottom gate insulating film 30, a top gate insulating film 31 and an interlayer insulating film 32 are provided on the upper surface of the gate insulating film 27 containing the gate electrodes 28 and 29 and are composed of silicon nitride.

The contact holes 33 are provided in the gate insulating film 27 above the source-drain regions 25c of the semiconductor thin film 25, the bottom gate insulating film 30, the top gate insulating film 31 and the interlayer insulating film 32. The contact holes 34 are provided in the gate insulating film 27 above the source-drain regions 26b of the semiconductor thin film 26, the bottom gate insulating film 30, the top gate insulating film 31 and the interlayer insulating film 32.

The source-drain electrodes 35 and 36 composed of aluminum-based metal, etc. are provided separately within each of the contact holes 33 and 34 which are in proximity to upper surface of the interlayer insulating film 32. An overcoat film 37 (transparent insulating film 6) composed of silicon nitride is provided on the upper surface of the interlayer insulating film 32 that contains the source-drain electrodes 35 and 36. The transparent conductive film 7 is provided on the upper surface of the overcoat film 37 which is composed of translucent metal, such as Indium Tin Oxide (ITO).

Also, the NMOS thin film transistor 21 is constituted by the semiconductor thin film 25, the gate insulating film 27, the gate electrode 28 and the source-drain electrodes 35. The PMOS thin film transistor 22 is constituted by the semiconductor thin film 26, the gate insulating film 27, the gate electrode 29 and the source-drain electrodes 36. Accordingly, the CMOS thin film transistors composed of the NMOS thin film transistor 21 and the PMOS thin film transistor 22, namely, the $1^{st}$ to $3^{rd}$ driver circuit sections 3, 4, 5 are formed as one unit above the glass substrate 1.

Next, the portion of the photoelectric conversion type thin film transistor 11 will be explained. A bottom gate electrode 41 is provided on the upper surface of the gate insulating film 27 which is composed of impermeable metal, such as aluminum-based metal, etc. and namely the same material as the gate electrodes 28 and 29 of the thin film transistors 21 and 22 for the driver circuit sections. The bottom gate insulating film 30 is provided on the upper surface of the gate insulating film 27 containing the bottom gate electrode 41. A semiconductor thin film 42 is provided on the upper surface of the bottom gate insulating film 30 above the bottom gate electrode 41 which is composed of intrinsic amorphous silicon.

A channel protective film 43 is provided on the upper surface central part of the semiconductor thin film 42 which is composed of silicon nitride. A contact layer 44 is provided on either side on the upper surface of the channel protective film 43 and on the upper surface of the semiconductor thin film 42 on either of the same sides. The source-drain electrodes 45 composed of an aluminum-based metal, etc. are provided on each upper surface of the contact layer 44 and each adjacent to the upper surface the bottom gate insulating film 30.

The top gate insulating film 31 is provided on the upper surface of the bottom gate insulating film 30 containing the source-drain electrodes 45. The top gate electrode 46 is provided on the upper surface of the top gate insulating film 31 above the semiconductor film 42 which is composed of translucent metal, such as ITO. The interlayer insulating film 32 and the overcoat film 37 are provided on the upper surface of the top gate insulating film 31 containing the top gate electrode 46. The transparent conductive film 7 is provided on the upper surface of the overcoat film 37.

Also, the photoelectric conversion type thin film transistors 11 are configured with thin film transistors for selection of the bottom gate type constituted with the bottom gate electrode 41, the bottom gate insulating film 30, the semiconductor thin film 42, the channel protective film 43, the contact layer 44 and the source-drain electrodes 45; and thin film transistors for sensors of the top gate type constituted with the top gate electrode 46, the top gate insulating film 31, the semiconductor thin film 42, the channel protective film 43, the contact layer 44 and the source-drain electrodes 45. Accordingly, the photoelectric conversion type thin film transistors 11 are formed as one unit above the glass substrate 1.

Next, the portion of the external connection terminals 9 for driver circuit sections will be explained. The external connection terminals 9 for the driver circuit sections are provided in the lower layer connection terminal part 9a on the upper surface of the interlayer insulating film 32 and provided the upper surface of the overcoat film 37; and the upper layer connection terminal part 9b is connected to the lower layer connection terminal part 9a via the contact holes 47 provided in the overcoat film 37. In this case, the lower layer connection terminal part 9a is formed of the same material as the source-drain electrodes 35 and 36 of the thin film transistors 21 and 22 for the driver circuit sections and the upper layer connection terminal part 9b is formed of the same material as the transparent conductive film 7.

Next, the $1^{st}$ to $3^{rd}$ interlayer contact portions will be explained. A $1^{st}$ upper layer wiring 48 is provided on the upper surface of the interlayer insulating film 32 in a $1^{st}$ interlayer contact portion which is connected to a $1^{st}$ lower layer wiring 50 provided on the upper surface of the gate insulating film 27 via a contact hole 49 provided in the interlayer insulating film 32, the top gate insulating film 31 and the bottom gate insulating film 30. In this case, the $1^{st}$ upper layer wiring 48 is formed of the same material as the source-drain electrodes 35 and 36 of the thin film transistors 21 and 22 for the driver circuit sections. The $1^{st}$ lower layer wiring 50 is formed of the same material as the gate electrodes 28 and 29 of the thin film transistors 21 and 22 for the driver circuit sections. Then, above the $1^{st}$ upper layer wiring 48, the overcoat film 37 and the transparent conductive film 7 are provided.

A $2^{nd}$ upper layer wiring 51 is provided on the upper surface of the interlayer insulating film 32 in a $2^{nd}$ interlayer contact portion which is connected to a $2^{nd}$ lower layer wiring 53 provided on the upper surface of the bottom gate insulating film 30 via a contact hole 52 provided in the interlayer insulating film 32 and the top gate insulating film 31. In this case, the $2^{nd}$ upper layer wiring 51 is formed of the same material as the source-drain electrodes 35 and 36 of the thin film transistors 21 and 22 for the driver circuit sections. The $2^{nd}$ lower layer wiring 53 is formed of the same material as the source-drain electrodes 45 of the photoelectric conversion type thin film transistor 11. Then, above the $2^{nd}$ upper layer wiring 51, the overcoat film 37 and the transparent conductive film 7 are provided.

A $3^{rd}$ upper layer wiring 54 is provided on the upper surface of the top gate insulating film 31 in a $3^{rd}$ interlayer contact portion which is connected to a $3^{rd}$ lower layer wiring 56 provided on the upper surface of the bottom gate insulating film 30 via a contact hole 55 provided in the top gate insulating film 31. In this case, the $3^{rd}$ upper layer wiring 54 is formed of the same material as the top gate electrode 46 of the photoelectric conversion type thin film transistor 11. The $3^{rd}$ lower layer wiring 56 is formed of the same material as the source-drain electrodes 45 of the photoelectric conversion type thin film transistor 11. Then, above the $3^{rd}$ upper layer wiring 54, the interlayer insulating film 32, the overcoat film 37 and the transparent conductive film 7 are provided.

Next, the electrical connections of each section shown in FIG. 3 will be explained. The bottom gate electrode 41 of the photoelectric conversion type thin film transistor 11 is connected to the source-drain electrodes 35 and 36 of the thin film transistors 21 and 22 for the driver circuit sections via the $1^{st}$ lower layer wiring 50 and the $1^{st}$ upper layer wiring 48.

The source-drain electrodes 45 of the photoelectric conversion type thin film transistor 11 are connected to the source-drain electrodes 35 and 36 of the thin film transistors 21 and 22 for the driver circuit sections via the $2^{nd}$ lower layer wiring 53 and the $2^{nd}$ upper layer wiring 51. The top gate electrode 46 of the photoelectric conversion type thin film transistor 11 is connected to the source-drain electrodes 35 and 36 of the thin film transistors 21 and 22 for the driver circuit sections via the $3^{rd}$ upper layer wiring 54, the $3^{rd}$ lower layer wiring 56, the $2^{nd}$ lower layer wiring 53 and the $2^{nd}$ upper layer wiring 51.

The gate electrodes 28 and 29 of the thin film transistors 21 and 22 for the driver circuit sections are connected to the external connection terminals 9 for the driver circuit sections via the $1^{st}$ lower layer wiring 50 and the $1^{st}$ upper layer wiring 48 (lead around wire for the driver circuit sections). The source-drain electrodes 35 and 36 of the thin film transistors 21 and 22 for the driver circuit sections are connected to the external connection terminals 9 for the driver circuit sections via the wiring (lead around wire for the driver circuit sections) which is not shown but is provided on the upper surface of the interlayer insulating film 32.

Next, referring to FIG. 1, the external connection terminals 8 portion for the transparent conductive film will be explained. The external connection terminals 8 for the transparent conductive film and the lead around wire 10 for the transparent conductive film are composed of the same material as the transparent conductive film 7 and provided on the upper surface of the transparent insulating film 6 (overcoat film 37). Then, the external connection terminals 8 for the transparent conductive film is connected to the transparent conductive film 7 via the lead around wire 10 for the transparent conductive film.

As mentioned above in this reading apparatus, the $1^{st\ to}\ 3^{rd}$ driver circuit sections (CMOS thin film transistors) 3, 4, 5 for driving a plurality of photoelectric conversion type thin film transistors 11 (photosensors) and these thin film transistors 11 above the glass substrate 1 are formed as one unit. A plurality of photoelectric conversion type thin film transistors 11 and the $1^{st}$ to $3^{rd}$ driver circuit sections 3, 4, 5 are covered by the transparent conductive film 7 for electrostatic protection via the transparent insulating film 6. By placing the transparent insulating film 6 in the intervening space between them (namely, between 11 and 3, 4, 5), it is not necessary to consider the layout relationship of the $1^{st}$ to $3^{rd}$ driver circuit sections 3, 4, 5 arrangement areas and the transparent conductive film 7 arrangement area. As a result, the $1^{st}$ to $3^{rd}$ driver circuit sections 3, 4, 5 in their individual arrangement areas can be located close to the read area 2. In the case of the above-stated embodiment and as shown in FIG. 1, because the $1^{st}$ to $3^{rd}$ driver circuit sections 3, 4, 5 arrangement areas are respectively provided in the areas adjacent to each of the right side, the left side and the lower portion side of the read area 2, the size of the entire device can be made smaller.

Also, in this embodiment it is not necessary to consider the layout relationship for neither the transparent conductive film lead around wire 10 nor the lead around wire for the above-mentioned driver circuit sections. Accordingly, in the case of the above-mentioned embodiment, since the transparent conductive film lead around wire 10 is provided on the upper surface of the transparent conductive film 7 and the above-stated lead around wire for the driver circuit sections is provided below the transparent conductive film 7, even if these intersect a short circuit does not occur. Consequently, it is not necessary to consider the spatial relationship of the transparent conductive film lead around wire 10 and the above-stated lead around wire for the driver circuit sections. Because of this, the line width of the lead around wire 10 for the transparent conductive film can be enlarged to some extent. The resistance of the lead around wire 10 for the transparent conductive film becomes lower and a sufficient electrical discharge effect can be acquired.

Furthermore, not only the plurality of photoelectric conversion type thin film transistors 11 but also the $1^{st}$ to $3^{rd}$ driver circuit sections 3, 4, 5 are covered by the transparent conductive film 7 for electrostatic protection via the transparent insulating film 6. Because of this configuration, not only the plurality of photoelectric conversion type thin film transistors 11 but also the $1^{st}$ to $3^{rd}$ driver circuit sections 3, 4, 5 (CMOS thin film transistors) can be fully protected from static electricity.

(Second Embodiment of the Image Reading Apparatus)

Figure 4:
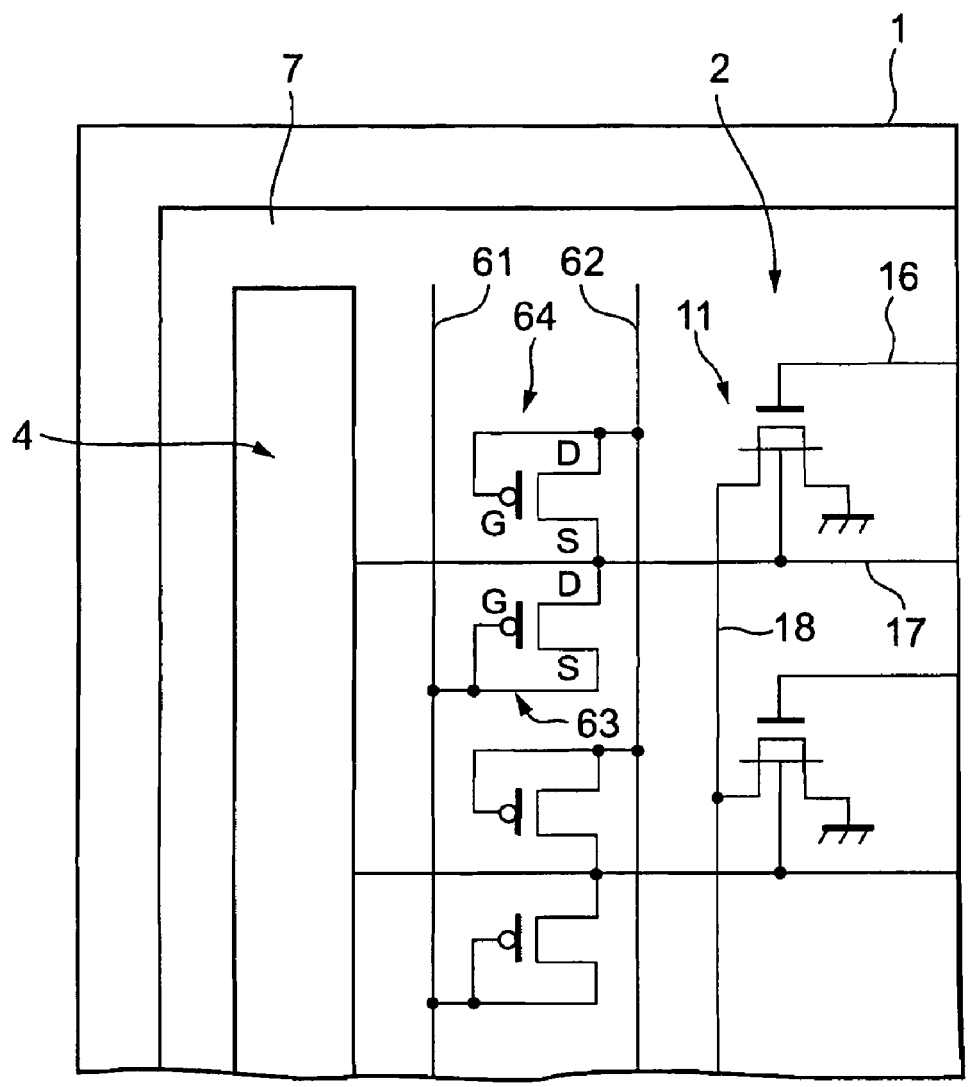
FIG. 4 is a top view diagram of the substantial part of the equivalent circuit of the image reading apparatus in a second embodiment of the present invention.

FIG. 4 is a top view diagram of the substantial part of the equivalent circuit of the image reading apparatus in the second embodiment of the present invention.

In this reading apparatus the difference from the case of the first embodiment as shown in FIG. 2 is that electrostatic protection elements are formed together as one unit above the glass substrate 1 between the plurality of photoelectric type thin film transistors 11 arranged in the read area 2 and for example the $2^{nd}$ driver circuit section 4 (bottom gate driver).

Specifically, above the glass substrate 1 between the read area 2 and the $2^{nd}$ driver circuit section 4, $1^{st}$ and $2^{nd}$ electrostatic protection lines 61 and 62 are provided and extended in a row direction. Diode connection type $1^{st}$ and $2^{nd}$ thin film transistors 63 and 64 for electrostatic protection are provided in parallel between the $1^{st}$ and $2^{nd}$ electrostatic protection lines 61 and 61 on either side of each bottom gate line 17.

The $1^{st}$ thin film transistor 63 for electrostatic protection is composed of an NMOS thin film transistor (for example, a structure which does not have a source-drain regions 25b composed of an N-type impurity low concentration region in an NMOS thin film transistor 21 as shown in FIG. 3). Then, the gate electrode G and the source electrode S are connected to the $1^{st}$ electrostatic protection line 61 and the drain electrode D is connected to the bottom gate line 17.

As for the $2^{nd}$ thin film transistor 64 for electrostatic protection, a PMOS thin film transistor (for example, the same structure as the PMOS thin film transistor 22 shown in FIG. 3) is constituted. Then, the gate electrode G and the drain electrode D are connected to the $2^{nd}$ electrostatic protection line 62 and the source electrode S is connected to the bottom gate line 17.

In a reading apparatus comprised with this electrostatic protection element when static electricity penetrates into a bottom gate line 17, this static electricity escapes on the $1^{st}$ electrostatic protection line 61 to ground potential via the $1^{st}$ thin film transistor 63 for electrostatic protection or escapes on the $2^{nd}$ electrostatic protection line 62 of predetermined potential via the $2^{nd}$ thin film transistor 64 for electrostatic protection. Thus, the penetration of static electricity to the $2^{nd}$ driver circuit section 4 is prevented. Also, the penetration of static electricity to the read area 2 from the $2^{nd}$ driver circuit section 4 side is similarly prevented. Further, the same electrostatic protection elements as the above are provided also between the $1^{st}$ and $3^{rd}$ driver circuit sections 3 and 5 besides the photoelectric conversion type thin film transistors 11 of the read area 2.

(Other Embodiments of the Image Reading Apparatus)

Although the above-stated embodiments explained cases where photoelectric conversion type thin film transistors are employed as photosensors, photo diodes may also be used.

Furthermore, in the above-mentioned embodiments, cases where CMOS thin film transistors composed of polysilicon thin film transistors which constitute the driver circuit sections was explained. However, the driver circuit sections may be constituted with only NMOS thin film transistors. Also, the driver circuit section may be constituted with a combination of polysilicon thin film transistors and amorphous silicon thin film transistors.

Next, an image reading system related to the present invention will be explained.

<Image Reading System>

(First Embodiment of the Image Reading System)

Figure 5:
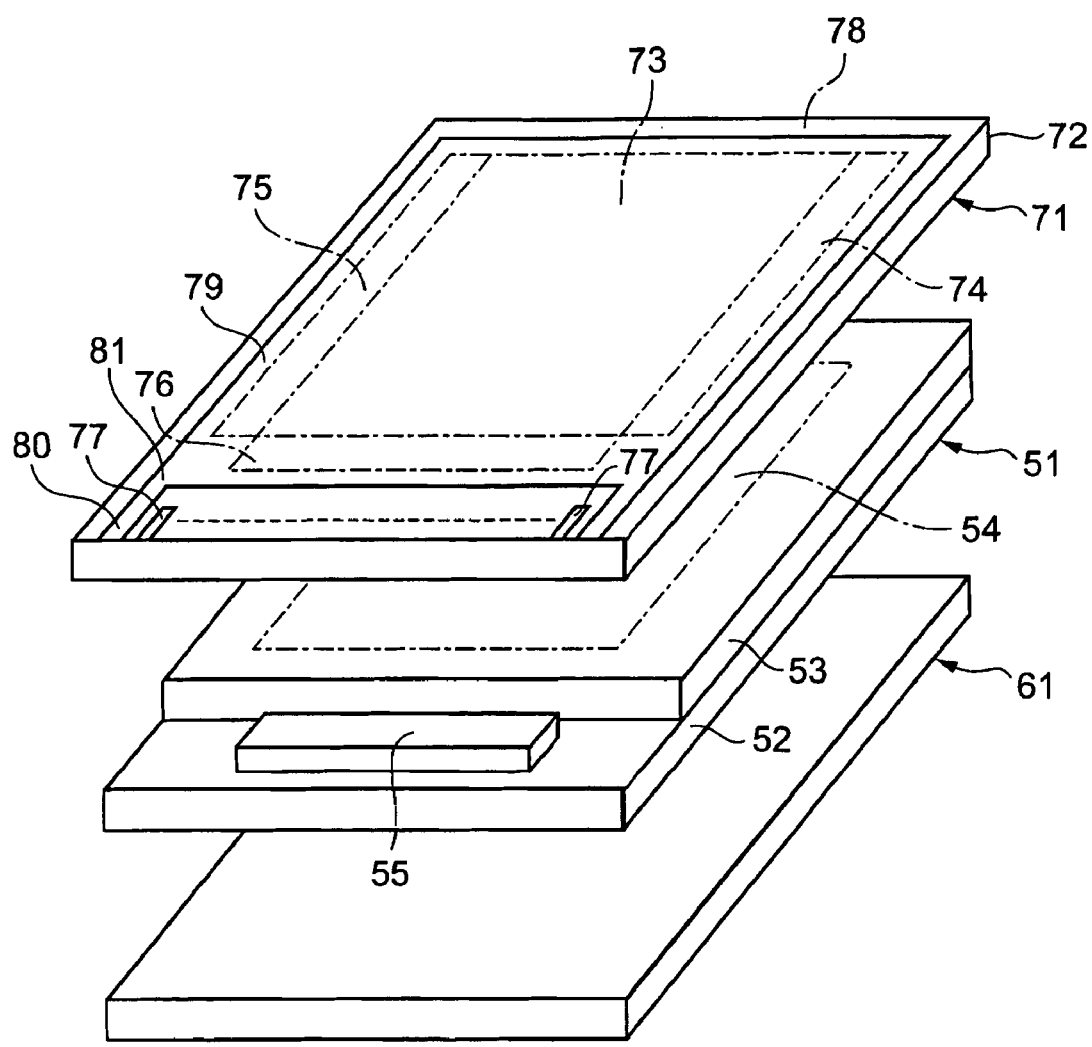
FIG. 5 is a perspective diagram of the substantial part of the image reading system in a first embodiment of the present invention.

FIG. 5 is a perspective diagram of the substantial part of the image reading system in the first embodiment of the present invention.

This image reading system is composed of an image display device with a backlight 61 located on the lower side of a liquid crystal display panel 51 and an image reading apparatus composed of a two-dimensional type photosensor panel 71 is located on the upper side of the liquid crystal display panel 51.

Although the liquid crystal display panel 51 is not shown in detail, it is an active-matrix type color liquid crystal display panel which has an active-matrix substrate 52 composed of glass formed with a plurality of display pixels which have driver elements and an opposing substrate 53 composed of glass which is comprised with a light filter. A crystalline liquid is enclosed between the active-matrix substrate 52 and the opposing substrate 53. A polarizing plate is affixed on each external surface of each of the substrates 52 and 53. The light transmission state is controlled by applying an electric field to the liquid crystal between the substrates 52 and 53 corresponding to a display signal. Light which exits from the backlight 61 is emitted to a viewing field side as display light corresponding to a display signal. Based on the above, image display can then be performed substantially in the central part of a display area 54 of the opposing substrate 53. In this case, the lower edge part of the active-matrix substrate 52 protrudes from the opposing substrate 53 and a semiconductor chip 55 for crystalline liquid drive is mounted on the upper surface of this protruding part. Although not shown in more detail, the backlight 61 for example is a planar light source type and emits light from the upper surface which counters the liquid crystal display panel 51.

The photosensor panel 71 is a component having the same configuration as each embodiment of the above-mentioned image reading apparatus and includes a glass substrate 72 (transparent substrate). A plurality of photosensors is arranged in a matrix form in substantially the central part of a read area 73 above the glass substrate 72 upon which a detectable object (for example, a finger) is placed and configured so that a detectable object image (for example, a fingerprint image) can be read. In this case, the read area 73 of the photosensor panel 71 is arranged in a position corresponding to the display area 54 of the liquid crystal display panel 51. The size of the read area 73 is equivalent to the size of the display area 54 of the liquid crystal display panel 51. $1^{st}$ to $3^{rd}$ driver circuit sections 74, 75, 76 for driving a plurality of photosensors are provided in the areas adjacent to each of the right side, the left side and the lower portion side of the read area 73 above the glass substrate 72. A plurality of external connection terminals 77 for the driver circuit sections are provided in the lower end part above the glass substrate 72. The external connection terminals 77 for the driver circuit sections are connected to the $1^{st}$ to $3^{rd}$ driver circuit sections 74, 75, 76 via a lead around wire. Also, the portion provided for an external connection terminal 77 of the photosensor panel 71 is located above the mounted portion for the semiconductor chip 55 of the active-matrix substrate 52 of the liquid crystal display panel 51. Accordingly, above the display area 54 of the liquid crystal display 51, the read area 73 of the photosensor panel 71 is arranged and polymerized. The upper end edge and the lower end edge of the photosensor panel 71 are arranged in a position which conforms generally to the upper end edge and the lower end edge of the active-matrix substrate 52 of the liquid crystal display panel 51.

Furthermore, similar to the case of the first embodiment of the above-mentioned image reading apparatus, a transparent insulating film 78 composed of an overcoat film is provided above the glass substrate 72 which includes a plurality of the photosensors 11 provided in the read area 73 of the photosensor panel 71 and the $1^{st}$ to $3^{rd}$ driver circuit sections 74, 75, 76. A transparent conductive film 79 for electrostatic protection may also be provided in the portion corresponding to an area some extent larger than the arrangement areas for the read area 73 on the upper surface of the transparent insulating film 78 and the $1^{st}$ to $3^{rd}$ driver circuit sections 74, 75, 76.

In this case, an external connection terminal 80 for the transparent conductive film is provided on either side of the lower end part of the upper surface of the transparent insulating film 78. Also, the external connection terminals 77 for the driver circuit sections are provided on the upper surface of the transparent insulating film 78. Here, the width of the external connection terminals 80 for the transparent conductive film, for example, constitute to some extent a width larger than the external connection terminals 77 for driver circuit sections. The external connection terminals 80 for the transparent conductive film are connected and formed on either side in the end part of the transparent conductive film 79 via a lead around wire for transparent conductive film provided on the upper surface of the transparent insulating film 78. In this case, the line width of the lead around wire 80 for transparent conductive film, for example, constitutes the same width as the external connection terminals 79 for the transparent conductive film. The external connection terminals 77 for the driver circuit sections are connected to the $1^{st}$ to $3^{rd}$ driver circuit sections 74, 75, 76 via the lead around wire for the driver circuit sections below the transparent insulating film 78.

Furthermore, an electrostatic protection element may be formed as one unit like the case of the second embodiment of the above-mentioned image reading apparatus above the glass substrate 72 among a plurality of photoelectric conversion type thin film transistors 11 in the read area 73 of the photosensor panel 71 and the $1^{st}$ to $3^{rd}$ driver circuit sections 74, 75, 76.

In addition, the transparent conductive film 79 is provided above the transparent insulating film 78 which is composed of the above-stated overcoat film. A configuration in which the external connection terminals 80 for the transparent conductive film is provided on either side in the lower end part on the upper surface of the transparent insulating film 78, as well as a configuration in which an electrostatic protection element is provided among the thin film transistors 11 in the read area 73 and the 1$^{st}$ to 3$^{rd}$ driver circuit sections 74, 75, 76 are similarly applicable in each of the following embodiments.

Moreover, in FIG. 5 the 1$^{st}$ and 2$^{nd}$ driver circuit section 74, 75 are provided in the right side and the left side above the photosensor panel 71. Although the horizontal direction size of the photosensor panel 71 may become slightly larger than the same direction size of a liquid crystal display panel 51 from the relationship of mounting the semiconductor chip 55 above the protruding part of the active-matrix substrate 52 of the liquid crystal display panel 51, the device can be configured so that both of these panels 71 and 51 are of the same width. In this manner for example, when encapsulating both panels 71 and 51 within a shielding case, these can be housed together with relative ease.

Next, the operation of the image reading system of the above-stated configuration will be explained.

Initially, when this image reading system is actuated in a display mode the backlight 61 lights up. The light projected from the upper surface of the backlight 61 enters the lower surface of the liquid crystal display panel 51. Based on a display signal, light exits to the viewing field side from the display area 54 of the liquid crystal display panel 52 as display light corresponding to the display driving of the liquid crystal display panel 51.

Outputted display light from the display area 54 permeates the read area 73 which is the same size as the display area 54 of the photosensor panel 71 and outputs from this read area 73. Accordingly, the image display by the liquid crystal display panel 51 is recognized visually via the photosensor panel 71.

Specifically, as illustrated in the above-mentioned FIG. 3, the bottom gate electrode 41 and the source-drain electrodes 45 portions of the photoelectric conversion type thin film transistors 11 of the photosensor panel 71, for example, are formed with impermeable metal composed of aluminum-based metal, etc. The remaining composition material has permeability. Accordingly, when light enters from the lower surface side with the backlight 61, this light permeates areas other than the portions of the bottom gate electrode 41 and the source-drain electrodes 45 composed of impermeable metal and exits from the read area of the photosensor panel 71, namely, the upper surface side. Here, because the bottom gate electrode 41 acts as a shield in relation to the semiconductor thin film 42 of the photoelectric conversion type thin film transistors 11, light is kept from entering into the semiconductor thin film 42 from the backlight 61.

Next, a finger is placed on this image reading system as a detectable object and the case where a fingerprint image is read will be explained.

When this image reading system is actuated in a fingerprint reading mode, the backlight 61 lights up and the light projected from the upper surface of the backlight 61 will enter into the lower surface of the liquid crystal display panel 51. In this case, the display driving of the liquid crystal display panel 51 is executed so that the entire display area 54 becomes for example a white display. Consequently, the light entering into the lower surface of the liquid crystal display panel 52 permeates the entire display area 54 and exits from the entire display area 54. The light exiting from the entire display area 54 permeates the read area 73 of the photosensor panel 71 which is the equivalent size as the display area 54 and exits from this read area 73.

In this condition, when a finger (detectable object) is placed on the upper surface of the read area 73 of the photosensors 71, the light exiting from the read area 73 of the photosensor panel 71 is irradiated by the finger. The light is reflected in a portion corresponding to the convex part (ridge) of a fingerprint and light is scattered in the portion corresponding to the concave part (crest) of a fingerprint. Accordingly, the light from a fingerprint image is acquired in which the light and dark information is highlighted optically corresponding to the irregularities of a fingerprint.

This fingerprint image light permeates the top gate electrode 46, the top gate insulating film 31 and the channel protective film 43 which are composed of translucent metal, such as Indium Tin Oxide and is irradiated by the semiconductor thin film 42. Accordingly, the electron-hole pair corresponding to the light and dark information of the fingerprint image light is induced and stored in the semiconductor thin film 42. Then, the image of a fingerprint is read.

In the image reading system in the embodiment mentioned above, since the photosensors 11 in the photosensor panel 71 are configured in a two-dimensional arrangement in a matrix form, a detectable object image (fingerprint image) of a detectable object (finger) placed on the upper surface of the read area 73 of the photosensor panel 71 can be read without difficulty. Moreover, because the size of the read area 73 has a relatively spacious surface area which is the equivalent size as the display area 54 of the liquid crystal display panel 51, an inferior reading cannot be easily generated. Also, since photosensor panel 71 is located above the liquid crystal display panel 51, it is not necessary to separately establish the photosensor layout area separately from the liquid crystal display panel 51. Thus, miniaturization of an electronic device with an image reading apparatus can be achieved.

In this image reading system set to the photosensor panel 71, since the CMOS thin film transistors constitute the 1$^{st}$ to 3$^{rd}$ driver circuit sections 74, 75, 76 for driving a plurality of photoelectric conversion type thin film transistors 11 as photosensors above the glass substrate 72 and these thin film transistors 11 are formed as one unit, the thickness of the photosensor panel 71 which contains the 1$^{st}$ to 3$^{rd}$ driver circuit sections 74, 75, 76 can be formed in a thinner shape. Therefore, the amount of increase in the thickness of an electronic device comprising this image reading apparatus can be substantially controlled.

Furthermore in this image reading apparatus, since the CMOS thin film transistors which constitute the 1$^{st}$ to 3$^{rd}$ driver circuit sections 74, 75, 76 are formed as one unit above the glass substrate 72 in the photosensor panel 71, in comparison with the case where the semiconductor chip 55 which constitutes these driver circuit sections is mounted above the glass substrate 72, flattening of the upper surface of the photosensor panel 71 can be accomplished. As a directly result, this would make this panel even easier to place a detectable object, for example a finger, on the upper surface of the photosensor panel 71.

Incidentally, in the reading mode of the above-described image reading system, the display color of the liquid crystal display panel 51 shifted the color to white. However, instead of being restricted to white only, various display conditions can be set. For example, the display colors of an active-matrix liquid crystal display panel 51 can be changed sequentially to red, green and blue. Also, it is possible to read an image of a detectable object for every display color. In this case, the read image can be created in a composite of each display color and a color image acquired. When performed in this manner, a color image can be read even if the photosensor panel 21 is a monochrome type.

Further, for example, it is also possible to display an image and message (alphanumeric information) for prompting or guiding placement of a finger to the read area 73 with the liquid crystal display panel 51.

Additionally, in this image reading system, since the light from the backlight 61 arranged in the lower side of the liquid crystal display panel 51 is used as an image reading light, for example a fingerprint, a light source only for image reading is not required. Consequently, the number of components can be decreased and result in lower manufacturing cost.

However, because the backlight 61 is the light source for the liquid crystal display panel 51, the image reading apparatus may be unable to read images, for example a fingerprint, favorably as the sensitivity of the photosensors 11 of the photosensor panel 71 is constant.

For example, when the light received is negatively influenced by the condition of a detectable object (i.e., the dryness condition of a person's finger surface skin) or the surrounding environment is too bright (for example, because a finger may permeate outdoor daylight to some extent, this permeated outdoor daylight also constitutes fingerprint reading light), the sensitivity of the photosensors 11 is saturated and becomes impossible to read an image favorably. Conversely, when the light received is too dark, this light condition causes difficulty in reading an image with sufficient contrast.

Therefore, in order to read an image favorably corresponding to a lighting situation, it can be possible to make an adjustment to the sensitivity level of the photosensors 11.

In addition, since display luminance can be variously changed corresponding to a display image with the liquid crystal display panel 51, when the light received by the photosensors 31 is too bright, it can be considered to shift the liquid crystal display 11 to a suitable gray display instead of a white display. Also, the brightness of the backlight 61 can be adjusted instead of adjusting the sensitivity of the photosensors 11 and further, both adjustment of the sensitivity of the photosensors 11 and adjustment of the light intensity which enters the photosensors 11 can be performed.

Here, the case where this image reading system is applied to portable electronic devices, such as a cellular phone, the size of the display area 54 of the liquid crystal display panel 51, generally, is a size (size level of a placed finger) larger than the minimum necessary to read a fingerprint. However, the size of the read area 73 of the photosensor panel 71 is the equivalent size of the display area 54 of the liquid crystal display 51 in FIG. 5. Therefore, when the photosensors 11 shown in FIG. 3 are arranged in matrix form the transmissivity of the entire read area 73 of the photosensor panel 71 becomes uniform. Accordingly, while using this image reading system in a display mode favorable display quality can be acquired due to the uniform transmissivity in the entire read area 73 of the photosensor panel 71.

(Second Embodiment of the Image Reading System)

Figure 6:
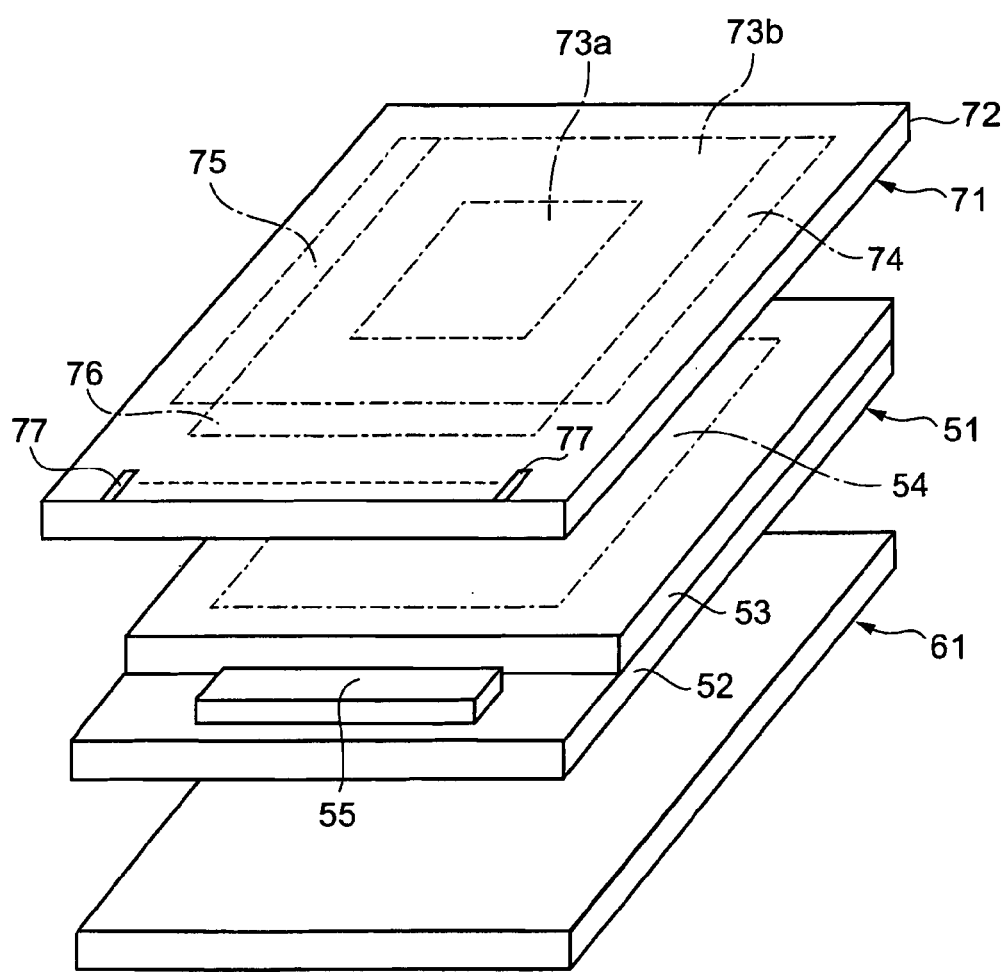
FIG. 6 is a perspective diagram of the substantial part of the image reading system in a second embodiment of the present invention.

FIG. 6 is a perspective diagram of the substantial part of the image reading system in a second embodiment of the present invention.

Here, with respect to any configuration equivalent to the image reading system mentioned above, the equivalent or same nomenclature is appended and further detailed explanation is abbreviated or omitted.

In this image reading apparatus the difference from the case of the first embodiment as shown in FIG. 5 is that in the photosensor panel 71, a read area 73a contains the minimum necessary size to read a fingerprint in an area corresponding to a part (for example, substantially in the central part) of the display area 54 of the liquid crystal display panel 51 and a dummy area 73b in the area corresponding to the remainder of the display area 54.

Specifically, the photoelectric conversion type thin film transistors 11 (photosensors) actually driven in the read area 73a are arranged in a matrix form. Similarly, dummy thin film transistors (dummy photosensors) which are not driven in the dummy read area 73b are arranged in a matrix form. Here, the dummy thin film transistors have the equivalent structure and size as the thin film transistors 11 and are formed with the same array pitch as the array pitch of the thin film transistors 11 in the read area 73a. Thus, the dummy thin film transistors which are not driven in the dummy read area 73b are arranged in a matrix form in order to equalize the transmissivity in the entire read area as the transmissivity of the dummy area 73b constitutes the same transmissivity as the read area 73a.

Then, in this image reading apparatus the photoelectric conversion type thin film transistors are arranged in a matrix form and actually driven only in the read area 73a which has a minimum necessary size to read a fingerprint. In comparison with the case shown in FIG. 5, the number of actually driven photoelectric conversion type thin film transistors 11 can be made into a requisite minimum. As a direct result, improvement in the yield, lower unit cost, miniaturization of the driver circuit sections, reduced power consumption, etc. can be achieved.

Accordingly, in the photosensor panel 71 of this image reading system, the areas of the read area 73a and the dummy read area 73b correspond to the display area 54 of the liquid crystal display panel 51. Upon actuation of the fingerprint reading mode, for example, the area corresponding to the read area 73a is shifted to a white display in the display area 54 of the liquid crystal display panel 51. Thus, it is possible to set up the placement area of a finger as a type of guide by shifting the area corresponding to the dummy read area 73b, for example, to a black display.

Further, upon actuation of the fingerprint reading mode, for example, the area corresponding to the read area 73a is shifted to a white display in the display area 54 of the liquid crystal display panel 51 and can be made to display an image and message (alphanumeric information) for prompting or guiding placement of a finger to the read area 73b.

(Third Embodiment of the Image Reading System)

Figure 7:
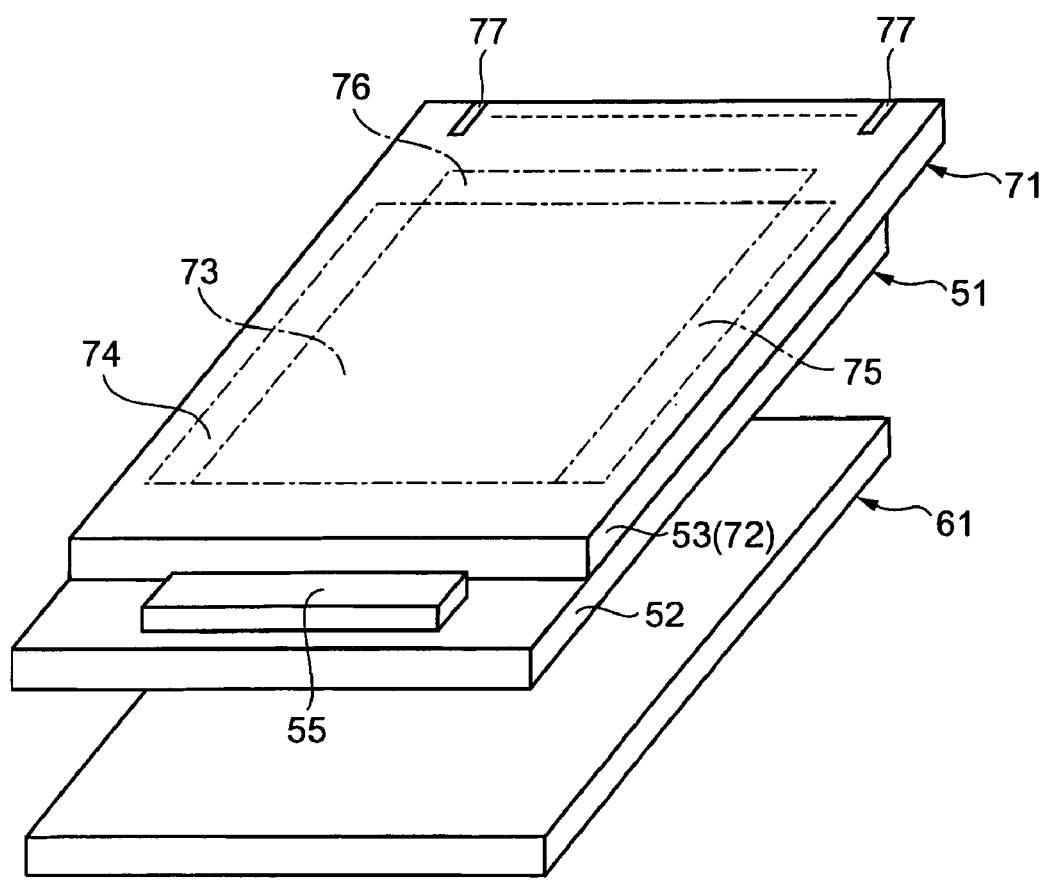
FIG. 7 is a perspective diagram of the substantial part of the image reading system in a third embodiment of the present invention.

FIG. 7 is a perspective diagram of the substantial part of the image reading system in the third embodiment of the present invention.

Here, with respect to any configuration equivalent to the image reading system mentioned above, the equivalent or same nomenclature is appended and further detailed explanation is abbreviated or omitted.

In this image reading apparatus the difference from the case of the first embodiment as shown in FIG. 5 is that the opposing substrate 53 of the liquid crystal display panel 51 is combined as a glass substrate (72) with the photosensor panel 71.

Specifically, a plurality of photoelectric conversion type thin film transistors 11 (not shown) are arranged in a matrix form in the external surface of the opposing substrate 53 of the liquid crystal display panel 51. Also, the read area 73, the $1^{st}$ to $3^{rd}$ driver circuit sections 74, 75, 76 and a plurality of external connection terminals 77 are provided.

In this case, the liquid crystal display panel 51 is driven with a field sequential drive method to be described later.

For this reason, although not shown on the inner surface (active-matrix substrate 52 and the surface of the opposing side) of the opposing substrate 53, a black mask, a common electrode and an orientation film are provided, but a light filter is not provided. Also, from the upper surface, the backlight 61 can switch and emit red light, green light and blue light.

Here, because the semiconductor chip 55 is mounted above the active-matrix substrate 52, the lower end part of the active-matrix substrate 52 protrudes from the opposing substrate 53. Also, in order to polymerize the read area 73 of the photosensor panel 71 and the display area of the liquid crystal display panel 51, a portion of the external connection terminals 77 provided in an end part side of the outer surface side of the opposing substrate 53 combined with the photosensor panel 71 which protrudes from the upper end part (the semiconductor chip 55 mounting side and opposite side) of the active-matrix substrate 52.

Next, an example of a field sequential drive method of this image reading apparatus will be briefly explained.

For example, one frame is split into three frames of the $1^{st}$ to $3^{rd}$ sub-frames and the write-in state of the pixels of each line is reset at the beginning of each sub-frame. Secondly, red, green and blue of each write-in display data are forwarded to the pixels of each line for each sub-frame. Subsequently, the backlight 61 lights up at the end of each sub-frame and red light, green light or blue light exits from the upper surface.

Specifically, in the $1^{st}$ sub-frame red light exits from the upper surface of the backlight 61, namely, the red image light which corresponds to the red display data written in the pixels of each line of the liquid crystal display panel 51 and exits from the read area 73 of the photosensor panel 71. Next, in the $2^{nd}$ sub-frame green light exits from the upper surface of the backlight 61, namely, the green image light which corresponds to the green display data written in the display pixels of each line of the liquid crystal display panel 51 and exits from the read area 73 of the photosensor panel 71. Subsequently, in the $3^{rd}$ sub-frame blue light exits from the upper surface of the backlight 61, namely, the blue image light which corresponds to the blue display data written in the display pixels of each line of the liquid crystal display panel 51 and exits from the read area 73 of the photosensor panel 71. Further, by processing the defined image light into a composite of the above-mentioned three colors (an RGB color composite), a color image is displayed.

In the embodiment of the image reading apparatus as described above, since the opposing substrate 53 of the liquid crystal display panel 51 is combined as a glass substrate (72) with the photosensor panel 71, the thickness of the image reading apparatus can be thinned by that same portion amount as well. Thus, the amount of increase in the thickness of an electronic device comprising this image reading apparatus can be substantially controlled.

(Fourth Embodiment of the Image Reading System)

Figure 8:
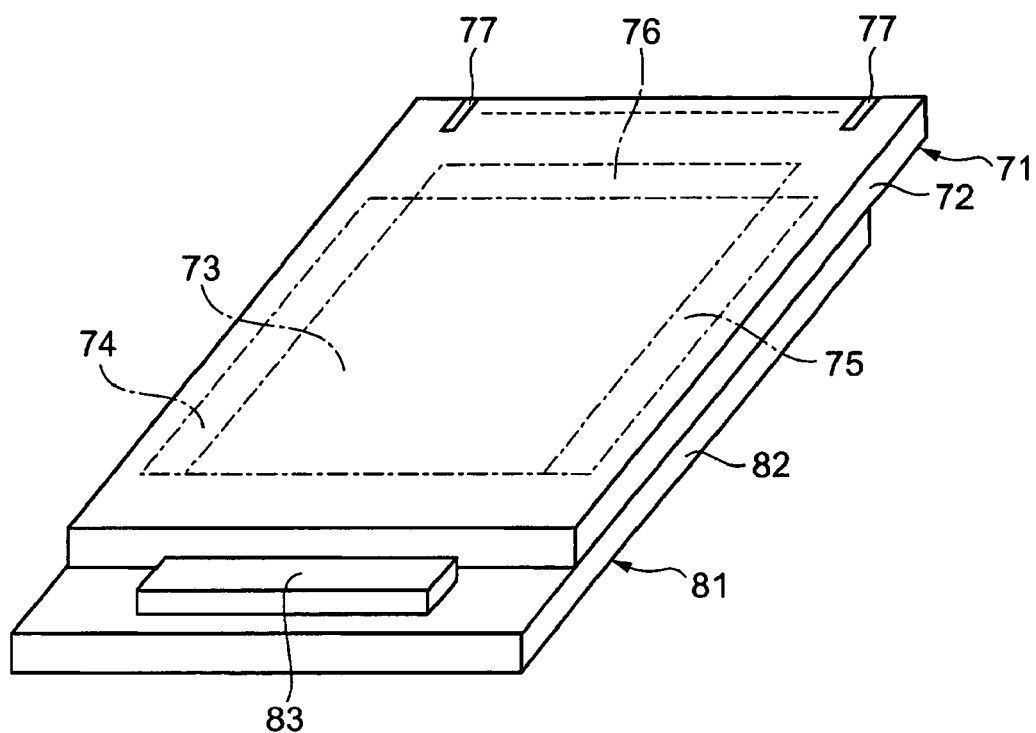
FIG. 8 is a perspective diagram of the substantial part of the image reading system in a fourth embodiment of the present invention.

FIG. 8 is a perspective diagram of the substantial part of the image reading system in the fourth embodiment of the present invention.

In this image reading apparatus the difference from the case of the first embodiment as shown in FIG. 5 is that this embodiment comprises a self-luminescence type display panel 81 instead of a non-self-luminescence type liquid crystal display panel 51 and the backlight 61 is omitted. For example, in the display panel 81 a self-emissive display technology of organic EL (Electro-Luminescence) can be applied. In this case, when the display panel 81 is an organic electroluminescence display panel with a top emission type structure, by selectively applying an electric field corresponding to the display driving of a plurality of organic EL layers arranged in a matrix form in the display area (area corresponding to the read area 73 of the photosensor panel 71) on the upper surface of the glass substrate 82, non-light emission (non-light generation) and light emission (light generation) to the opposite side with the glass substrate 82 side can both be accomplished. As an image display can be performed when the photosensor panel 71 permeates this luminescent light.

In this case, the glass substrate 72 of the photo sensor panel 71 are bonded together with sealant on the upper surface of the display panel 81 which is provided in the periphery of the display area of the display panel 81. The lower end part of the display panel 81 protrudes from the photosensor panel 71 and the semiconductor chip 83 for display panel drive is mounted on the upper surface of this protruding part. The portion of the external connections terminals 77 of the photosensor panel 71 protrudes from the upper end part of the display panel 81.

In this image reading system, because backlight is not comprised in comparison with the case of the third embodiment of the image reading system shown in FIG. 7, the image reading apparatus can afford substantial resizing and the remodeled electronic device comprised with this structure can be thin-shaped.

When the display panel 81 has an organic EL type display panel, the anode electrode, the organic electroluminescence layer and the cathode electrode are laminated by the display area of the upper surface of the glass substrate 82. However, due to permeation of impurities over time, such as exterior moisture, a dark spot may be generated which is a non-luminous area and gradually expand. Conversely, by placing a sealant surrounding the display area above the display panel 82 and bonding together the glass substrate 72 of the display panel 81 and the photosensor panel 71 using this sealant, permeation of impurities, for example moisture to the display panel 81 composed of an organic EL display panel can be favorably prevented from occurring. Accordingly, generation of a dark spot and further growth can be controlled and reliability elevated.

An organic EL display panel which forms the display panel 81 may have a bottom emission type structure. In this case, the anode electrode, the organic EL layer, the cathode electrode and the protective film are laminated by the display area on the lower surface of the glass substrate 82. Thus, light generation toward the glass substrate 82 side can be performed and an image displayed like explained above.

(Other Embodiments of the Image Reading System)

Although the above-stated embodiments explained a case where a photoelectric conversion type thin film transistor is used as the photosensors, it is also possible to use not only this type but also photo diodes. Moreover, although the above-described embodiment described a case where CMOS thin film transistors composed of polysilicon thin film transistors constitute the driver circuit sections, it is feasible not just to use this type but to constitute these sections with only NMOS thin film transistors. In addition, a combination of polysilicon thin film transistors and amorphous silicon transistors is also possible.

While the present invention has been described with reference to the preferred embodiments, it is intended that the invention be not limited by any of the details of the description therein but includes all the embodiments which fall within the scope of the appended claims.

What is claimed is:

1. An image reading system comprising:
an image display device which comprises a display panel with an image display area that is formed by a plurality of display pixels, and which emits display light corresponding to a display signal from the image display area from a viewing field side of the image display device so as to display an image; and a photosensor panel which reads an image of a detectable object placed on a read area that receives at least a portion of the display light emitted from the image display area;

wherein the photosensor panel comprises:
a transparent substrate which has the read area and which is provided on the viewing field side of the image display device;
a plurality of photosensors which are formed in the read area above the transparent substrate;
a driver circuit section, which drives the photosensors, and which is formed above the transparent substrate at an outer side of the read area as one unit with the photosensors above the transparent substrate;
a transparent insulating film provided over the plurality of photosensors and the driver circuit section;
a transparent conductive film for electrostatic protection, which is provided above the transparent insulating film;
a plurality of external connection terminals for the driver circuit section which are provided at an end part of the transparent substrate;
a plurality of external connection terminals for the transparent conductive film which are provided at the end part of the transparent substrate;
a first lead around wire which is provided under the transparent insulating film, and which connects the driver circuit section and the plurality of external connection terminals for the driver circuit section; and
a second lead around wire which is provided on the transparent insulating film, and which connects the transparent conductive film and the plurality of external connection terminals for the transparent conductive film.

2. The image reading system according to claim 1, wherein the driver circuit section is provided adjacent to the read area above the transparent substrate.

3. The image reading system according to claim 1, wherein the read area is an area corresponding to the image display area of the display panel in the image display device and the read area has a surface area that is at least as large as a surface area of the image display area.

4. The image reading system according to claim 1, wherein the photosensor panel further comprises an electrostatic protection element which is formed as one unit among the plurality of photosensors and the driver circuit section.

5. The image reading system according to claim 1, further comprising means for performing a display which prompts or guides placement of the detectable object to the read area of the photosensor panel.

6. The image reading system according to claim 1, wherein the read area of the photosensor panel corresponds only to a portion of the image display area of the display panel in the image display device; and
wherein the photosensor panel includes a dummy read area which has a transmissivity equivalent to a transmissivity of the read area.

7. The image reading system according to claim 6, wherein dummy photosensors, which are not driven by the driver circuit section, and which have an equivalent size and structure to the photosensors, are arranged in a matrix form in the dummy read area.

8. The image reading system according to claim 6, further comprising means for performing a display, in an area of the image display area corresponding to the dummy read area, which prompts or guides placement of the detectable object to the read area.

9. The image reading system according to claim 6, wherein an outer size of the photosensor panel is equivalent to an outer size of the display panel.

10. The image reading system according to claim 1, wherein each of the photosensors comprises:
a source electrode and a gate electrode, which are composed of an electrode material having permeability, and which are formed across a channel region that is composed of a semiconductor layer provided above the transparent substrate; and
a first gate electrode composed of an electrode material having permeability and a second gate electrode composed of an electrode material having impermeability, which are formed at an upper side and a lower side, respectively, of the channel region via respective insulating films.

11. The image reading system according to claim 1, further comprising:
means for sequentially changing display colors of the display panel between red, green and blue; and
means for reading, with the photosensor panel, images of the detectable object under illumination by each of the display colors, and for creating a composite from the images read under the respective display colors and acquiring a color image.

12. The image reading system according to claim 1, wherein the display panel is a transmissive type color liquid crystal display panel comprising two opposing transparent substrates; and
wherein the color liquid crystal display panel further comprises a backlight on a side thereof opposite to the viewing field side.

13. The image reading system according to claim 1, wherein the display panel comprises a liquid crystal display panel which is operable by a field sequential drive method and which comprises two opposing transparent substrates; and
wherein the display panel further comprises a backlight provided on a side thereof opposite to the viewing field side, and the backlight is controlled to change colors emitted therefrom between red, green and blue, sequentially.

14. The image reading system according to claim 1, wherein the display panel comprises two opposing transparent substrates, and one of the transparent substrates which is provided at the viewing field side of the display panel serves as the transparent substrate in the photosensor panel.

15. The image reading system according to claim 1, wherein the display panel is a self-luminescence type display panel comprising light emitting devices as display pixels.

16. The image reading system according to claim 15, wherein the display panel is an organic electroluminescence display panel which comprises organic electroluminescence display devices as the light emitting devices.

17. The image reading system according to claim 16, wherein the organic electroluminescence display panel has a top emission structure type.

18. The image reading system according to claim 16, wherein the organic electroluminescence display panel and the transparent substrate in the photosensor panel are bonded together with sealant.

19. An image reading system comprising:

an image display device which comprises a display panel with an image display area which is formed by a plurality of display pixels, and which emits display light corresponding to a display signal from the image display area from a viewing field side of the image display device so as to display an image; and a photosensor panel which reads an image of a detectable object placed on a read area that receives at least a portion of the display light emitted from the image display area;

wherein the photosensor panel comprises:

a transparent substrate which has the read area and which is provided on the viewing field side of the image display device;

a plurality of photosensors which are formed in the read area above the transparent substrate; and a driver circuit section, which drives the photosensors, and which is formed above the transparent substrate at an outer side of the read area as one unit with the photosensors above the transparent substrate;

wherein the read area of the photosensor panel corresponds to a portion of the image display area of the display panel in the image display device; and wherein the photosensor panel includes a dummy read area which has a transmissivity equivalent to a transmissivity of the read area; and wherein the image reading system further comprises means for performing a display, in an area of the image display area corresponding to the dummy read area, which prompts or guides placement of the detectable object to the read area of the photosensor panel.

* * * * *